United States Patent [19]

Readman

[11] Patent Number: 4,815,525

[45] Date of Patent: Mar. 28, 1989

[54] DEPLOYABLE SPACE RADIATOR WITH CONDENSER

[75] Inventor: John Readman, Rockford, Ill.

[73] Assignee: Sundstrand Corporation, Rockford, Ill.

[21] Appl. No.: 109,906

[22] Filed: Oct. 19, 1987

Related U.S. Application Data

[62] Division of Ser. No. 812,172, Dec. 23, 1985.

[51] Int. Cl.[4] .................... F03H 5/00; B64G 1/44
[52] U.S. Cl. ........................................ 165/41; 165/86;
165/104.14; 244/163
[58] Field of Search ................ 165/41, 76, 86, 104.14;
244/158 R, 163, 173

[56] References Cited

U.S. PATENT DOCUMENTS

| | | |
|---|---|---|
| 3,490,718 | 1/1970 | Vary ..................... 244/163 |
| 3,532,299 | 10/1970 | Williamson et al. ............. 244/163 |
| 3,715,600 | 2/1973 | Fletcher et al. . |
| 4,347,023 | 8/1982 | Rizos . |
| 4,373,690 | 2/1983 | Stillman et al. . |
| 4,588,151 | 5/1986 | Mori ..................... 244/173 |
| 4,634,086 | 1/1987 | Mori ..................... 244/173 |

FOREIGN PATENT DOCUMENTS

| | | |
|---|---|---|
| 1926983 | 8/1971 | Fed. Rep. of Germany ...... 244/173 |
| 2727101 | 12/1977 | Fed. Rep. of Germany ...... 244/173 |
| 3042923 | 7/1982 | Fed. Rep. of Germany . |
| 1127836 | 9/1968 | United Kingdom ............... 244/173 |
| 2103011 | 2/1983 | United Kingdom ............... 244/173 |

OTHER PUBLICATIONS

Scheel, "Low-Cost Solar Electric Test Bed for Ion Thruster Systems" Journal Spacecraft & Rockets, vol. 9, No. 12, Dec. 1972 pp. 853–859.

Primary Examiner—Albert W. Davis, Jr.
Assistant Examiner—John K. Ford
Attorney, Agent, or Firm—Wood, Dalton, Phillip Mason & Rowe

[57] ABSTRACT

A deployable radiator panel system for use in spacecraft or the like for rejecting power when exposed to space. A plurality of panels are mounted in stacked juxtaposition in stored condition for rotation from the stored condition about a common axis in a fan-type manner to fully operative angular positions to form a composite panel arrangement. The panels are formed with bowtie configurations having diverging panel sections projecting from opposite sides of the axis of rotation to form a circular panel array. Drive mechanisms are provided for drawing the panels axially to a generally common plane when the panels are in their fully operative angular positions, and for drawing the panels into tight engagement with a common condenser.

19 Claims, 2 Drawing Sheets

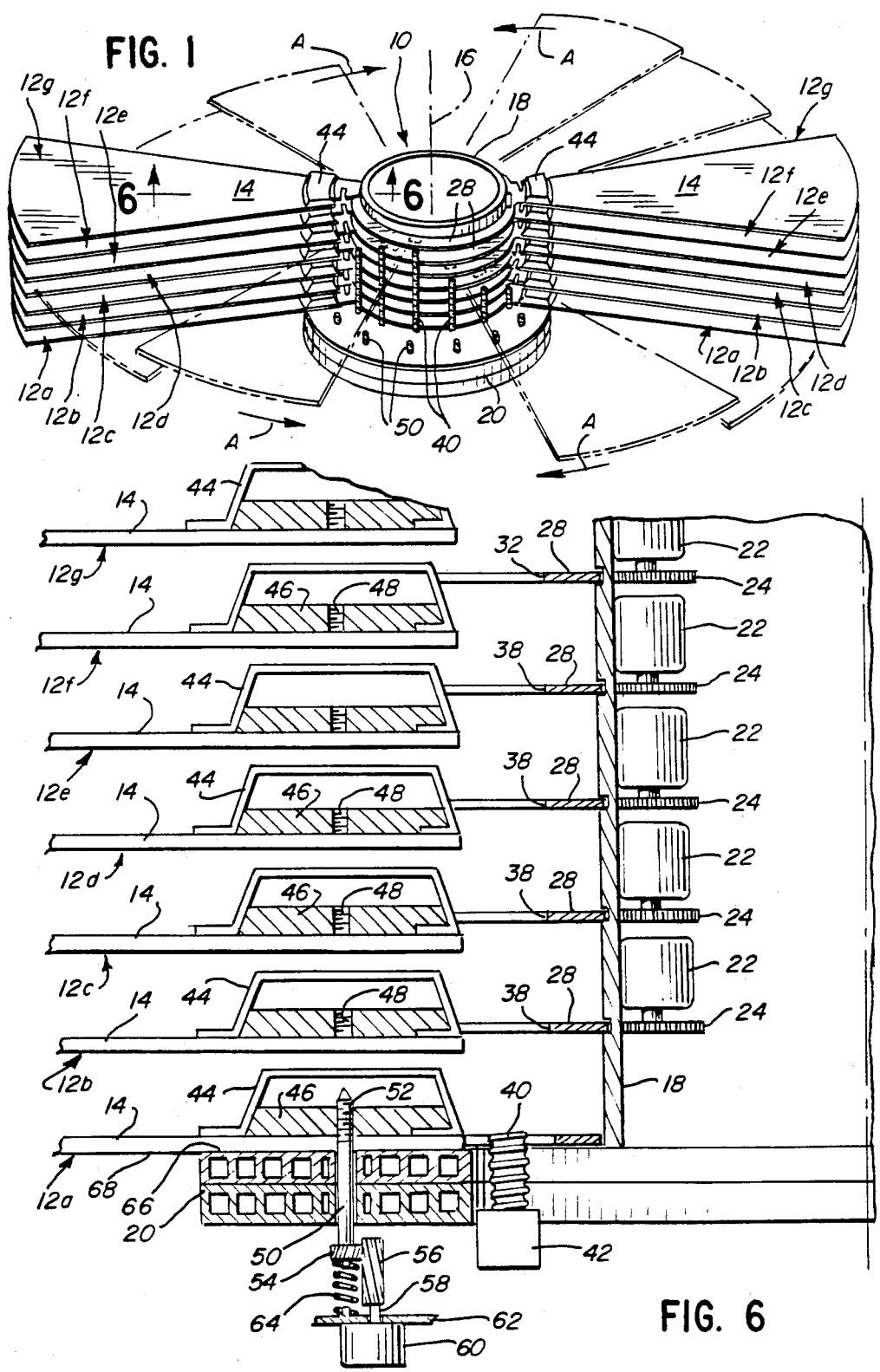

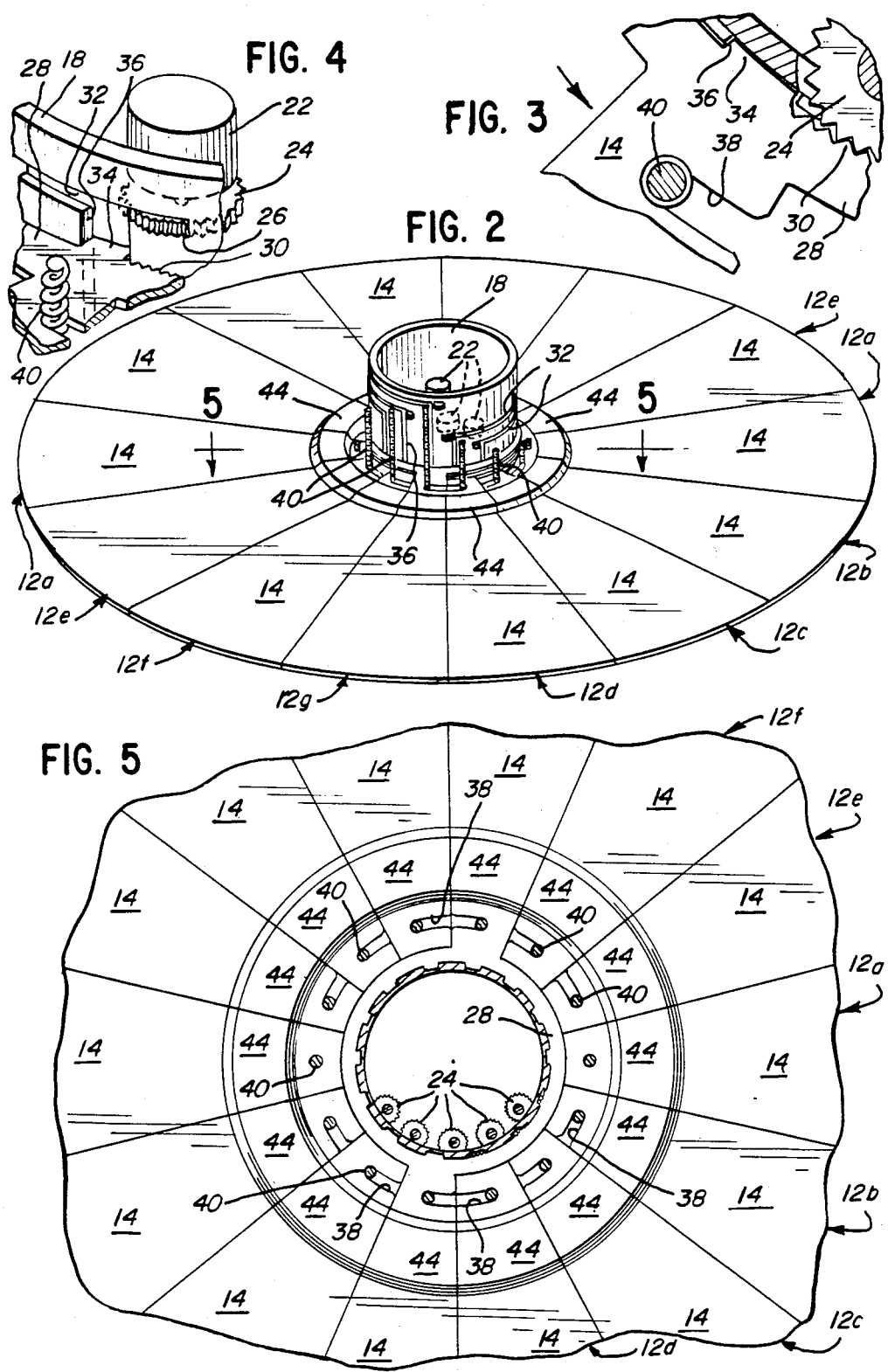

DEPLOYABLE SPACE RADIATOR WITH CONDENSER

This is a division of application Ser. No. 812,172 filed Dec. 23, 1985, pending.

FIELD OF THE INVENTION

This invention is directed to a deployable space radiator panel system for use in spacecraft or the like for rejecting power when exposed to space.

BACKGROUND OF THE INVENTION

The use of space radiator or panel systems to provide heat rejection in spacecrafts, satellites or the like is well known. When a space vehicle is launched, the space available in the vehicle or its launching rocket is limited for carrying out its mission. However, the vehicle must have a source of electrical energy provided by a large area utilizing solar energy along with a power conversion system. Therefore, the space vehicle must be designed to include surface areas which can be exposed to radiation after the energy conversion system, for instance, has been separated from the vehicle.

The size and weight of space vehicles in general, must be minimized for launch considerations. Therefore, the panel systems themselves must be designed to minimize size and maximize the compactness of the structure. The use of solar generators which can be folded or swung out from the vehicle has afforded a successful solution of the problem.

Stacked solar cell arrays or panels are known as illustrated in U.S. Pat. No. 3,715,600 to Fletcher, dated Feb. 6, 1973. Hold down support systems for foldable or swinging panels also are known as illustrated in U.S. Pat. Nos. 4,347,023 to Rizos, dated Aug. 31, 1982, and 4,373,690 to Stillman, dated Feb. 15, 1983. Most such endeavors are concerned with satellite panels which are relatively small or concise to begin with. Other problems are encountered when dealing with larger vehicles such as a space stations which are launched by a space shuttle, for instance, which is manned and has severe space limitation problems in accommodating all of the extraneous equipment involved. To further complicate the size problem, such vehicles are elongated and have long but narrow cargo bays. For instance, a space shuttle bay may be sixty feet long but only fifteen feet in diameter. Space vehicles and their energy conversion systems, space radiators or the like, must be adapted to such configurations.

This invention is directed to solving one or more of the above-identified problems.

SUMMARY OF THE INVENTION

An object, therefore, of the invention is to provide a new and improved deployable space radiator system for use in spacecraft or the like for rejecting power when exposed to space.

In the exemplary embodiment of the invention, the system generally includes a plurality of space radiator panels and means for mounting the panels in stacked juxtaposition in stored condition including a common axis of rotation. Means are provided for rotating at least some of the panels about the common axis in a fan type manner to fully operative angular positions to form a composite panel arrangement. Means are provided for moving at least some of the panels axially to a generally common plane when the panels are in their fully operative angular positions.

More particularly, the radiator panels are elongated and the common axis of rotation is located intermediate the ends of the panels. Preferably, each panel is formed with a bowtie configuration with diverging panel sections projecting from opposite sides of the axis of rotation.

The mounting means includes a central drum-like structure about the axis of rotation. The rotating means for the panels include a plurality of motors mounted inside the drum for individually rotating the respective panels to their fully operative angular positions. Each motor has a drive gear engageable through a window in the drum with a gear segment formed on the inner periphery of the respective panel.

Condenser means is provided at one axial end of the stack of radiator panels, and the panels are drawn axially into engagement with the condenser means after the panels are rotated to their fully operative angular positions. Specifically, a plurality of axially extending, post-like ball screw members are spaced angularly about the outside of the drum. The ball screws engage within angularly open-ended slots in the panels to draw the panels toward the condenser into the aforesaid common plane. The ball screws are of progressively varying heights about the drum to permit some of the panels to pass over some of the ball screws when being rotated to their operative angular positions. Second screw means are individually engageable with respective reinforcing hubs on the panels to draw the panels into tight engagement with the condenser means. The condenser means has a generally flat engaging surface facing the panels, and the panels have complementary flat engaging surfaces to provide an efficient heat-transfer interface.

As disclosed herein, one of the panels is fixed and the other panels are even in number. One-half of the panels are rotatable in one direction and the other one-half of the panels are rotatable in the opposite direction relative to the fixed panel toward their fully operative angular positions. This minimizes the amount of rotation necessary for deployment.

Other objects, features and advantages of the invention will be apparent from the following detailed description taken in connection with the accompanying drawings.

DESCRIPTION OF THE DRAWINGS

The features of this invention which are believed to be novel are set forth with particularity in the appended claims. The invention, together with its objects and the advantages thereof, may be best understood by reference to the following description taken in conjunction with the accompanying drawings, in which like reference numerals identify like elements in the figures and in which:

FIG. 1 is a perspective view of the deployable radiator panel system of the invention, illustrating the radiator panels in full lines in their stacked, stored condition and in phantom being rotated to their operative angular positions;

FIG. 2 is a view similar to that of FIG. 1, with the radiator panels fully fanned out and drawn downwardly to their operative positions;

FIG. 3 is a fragmented plan view on an enlarged scale, partially sectioned, to illustrate the engagement of a motor gear and gear segment at the inner periphery of one of the panels;

FIG. 4 is a fragmented perspective view, on an enlarged scale, of the engagement of a radiator panel with a ball screw for drawing the panel downwardly toward its operative position;

FIG. 5 is a fragmented section, on an enlarged scale, taken generally along line 5—5 of FIG. 2; and FIG. 6 is a fragmented section, on an enlarged scale, taken generally along line 6—6 of FIG. 1.

DETAILED DESCRIPTION OF THE PREFERRED EMBODIMENT

Referring to the drawings in greater detail, and first to FIG. 1, a deployable space radiator panel system, generally designated 10, is illustrated for use in spacecraft or the like for rejecting power when exposed to space. The system is designed for storage in an elongated cargo bay of a space shuttle type craft for movement by appropriate means from a stored position within the bay to a deployed position whereupon the system can be expanded to fully operative condition. For instance, as stated above, the cargo bay of a space shuttle may be as long as sixty feet but only fifteen feet in diameter. In order to supply sufficient energy to the complicated systems aboard large spacecraft, a large solar energy system is required. To this end, the system 10 of this invention includes a plurality of elongated space radiator panels, generally designated 12a–12g.

As seen in FIG. 1, each panel is formed with a generally bowtie configuration with diverging panel sections 14 projecting from opposite sides of the center of the system which is defined by a central axis of rotation 16. A drum-like center support or mounting means 18 is provided and about which the panels are mounted and rotatable. A condenser 20 is mounted at one end, the lower end as viewed in FIG. 1, of drum 18 and the stacked array of panels 12a–12g. As will be described in greater detail, the panels are rotatable about axis 16 in the direction of arrows "A". It can be seen that some of the panels rotate in opposite directions. This is effected to minimize the amount of rotation necessary to fully deploy the system. As will be seen below, lower panel 12a is fixed. The remaining panels 12b–12g are even in number, with one-half of the panels being rotatable in one direction about axis 16 and the other one-half of the panels being rotatable in the opposite direction relative to fixed panel 12a.

FIG. 2 shows radiator panels 12a–12g in their fully operative angular positions and drawn downwardly into a generally common plane to provide a composite heat pipe structure to condenser 20. The condenser is part of a power conversion system and may be in communication with an engine that develops heat. A cooling medium is flowed from the engine to the condenser. The radiator panels face toward outer space (e.g. away from the sun) and provide a heat pipe system to radiate the heat into space and thereby cool the cooling medium passing through condenser 20.

Means are provided within mounting drum 18 in operative association with radiator panels 12a–12g, through the drum, for rotating panels 12b–12g about axis 16 in a fan-type manner to their fully operative angular positions described above. More particularly, referring to FIGS. 3 and 4 in addition to FIGS. 1 and 2, a plurality of motors 22 are mounted within drum 18 for individually rotating the respective panels in their prescribed direction as described above. Each motor is vertically positioned in alignment with its respective stacked panel, as seen in FIG. 2 (as well as FIG. 6).

FIGS. 3 and 4 show that each motor 22 has a drive gear 24 projecting outwardly through a window 26 in drum 18. The inner periphery of each radiator panel 12b–12g is provided with an annular ring 28 which has a gear segment 30 engageable with drive gear 24 when the panels are in their stacked positions. A horizontal slot 32 is formed in drum 18 and is positioned vertically for each respective panel when in stacked position. Each panel has a tongue 34 which rides in slot 32 when rotated by driving engagement between gear 24 and gear segment 30. When the panel reaches its prescribed angular position of deployment, a vertically extending slot 36 is formed in drum 18 in communication with the respective horizontal slot 32 for that particular panel. The vertical slot 36, in essence, defines the specific angular position for the respective panel.

Means are provided first to draw the radiator panels downwardly into the common plane as illustrated in FIG. 2, and second to draw the panels tightly into engagement with condenser 20 for heat transmission purposes.

Specifically, each radiator panel has an angularly open-ended slot 38 shown enlarged in FIG. 3. A plurality of axially extending, post-like members in the form of ball screws 40 are spaced angularly about drum 18 for individually engaging within slots 38 of the panels. It can be seen in FIGS. 1 and 2, that ball screws 40 are of progressively varying heights in both directions of rotation about the drum to permit the upper-most panels to pass over the ball screws thereunder when moving to their respective angular positions. Once the panels are in their proper angular positions, the ball screws are selectively rotated to draw the panels downwardly to their generally coplanar positions as illustrated in FIG. 2. During this vertically downward movement, tongues 34 at the inner peripheries of the panels ride downwardly in vertical slots 36 of drum 18. Appropriate motor means 42 (FIG. 6) are provided for rotating the ball screws.

The second means for drawing the radiator panels into tight engagement with condenser means 20 is illustrated in FIG. 6. Initially, it should be noted that each panel is provided with a reinforcing hub 44. An enlarged nut-like member 46 is mounted within each hub and is formed with an internally threaded bore 48. A rotatable rod 50 has an externally threaded distal end 52 for threaded engagement within bore 48. A gear 54 is fixed to the opposite end of rod 50 for engagement with a drive gear 56 mounted on a drive shaft 58 of a motor 60. The motor is fixed to a frame component 62. A coil spring 64 is sandwiched between frame component 62 and gear 54 on the lower end of rod 50. The spring biases the rod upwardly to facilitate threaded engagement within internally threaded bore 48. Two reinforcing hubs 44 are provided on each panel on opposite sides of drum 18, and two such driving mechanisms as described immediately above are provided for tightly drawing the panel into engagement with condenser 20. It should be noted that the top of condenser 20 is formed with a flat surface 66 and the lower side of each panel is provided with a flat surface 68 to afford a tight interface which can be clamped for efficient energy transmission.

FIG. 6 also shows that rings 28 for each radiator panel 12b–12g projects inwardly from the respective hub 44 at a progressive increasing height above the plane of the panel. This is done so that ball screws 42 can draw each panel downwardly into a common plane for engagement by threaded rods 50 to draw all of the panels further into tight engagement with the condenser.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein.

What is claimed is:

1. A deployable radiator panel system for use in spacecraft or the like, comprising:
   a plurality of generally planar panels;
   means for mounting the panels in stacked, generally parallel juxtaposition in stored condition and defining a common axis of rotation of the panels generally perpendicular to the planes of the panels;
   condenser means at one axial end of the stack of panels;
   means for rotating at least some of the panels relative to each other in the respective planes of the panels about said common axis in a fan-type manner to fully operative angular positions away from said stacked juxtaposed condition to form a composite panel arrangement; and
   means for moving at least some of the panels axially in a direction generally perpendicular to the planes of the panels to draw the panels into engagement with the condenser means and in a generally common plane when the panels are in their fully operative angular positions.

2. The deployable panel system of claim 1 wherein said means for moving the panels axially include first means for drawing at least some of the panels axially into said common plane and second means for drawing the panels into tight engagement with the condenser means.

3. The deployable panel system of claim 2 wherein said first means includes a plurality of axially extending post-like members spaced angularly about said mounting means for individually engaging respective ones of the panels.

4. The deployable panel system of claim 3 wherein the post-like members comprise ball screws engageable within angularly open-ended slots in the panels.

5. The deployable panel system of claim 3 wherein the post-like members re of progressively varying heights to permit some of the panels to pass over some of the post-like members when being rotated to their operative angular positions.

6. The deployable panel system of claim 2 wherein each panel includes a reinforcing hub located inwardly toward the axis of rotation thereof and said second means is engageable individually with the respective reinforcing hubs.

7. The deployable panel system of claim 6 wherein said second means include power actuated screw means engageable with the reinforcing hubs.

8. The deployable panel system of claim 2 wherein the condenser means has a generally flat engaging surface facing the panels and the panels have complementary flat engaging surfaces.

9. A deployable radiator panel system for use in spacecraft or the like, comprising:
   a central support structure defining an axis of rotation;
   a plurality of elongated panels having a bowtie configuration and mounted on mounting means about the central support structure to define diverging panel sections projecting from opposite sides thereof;
   means on the central support structure for rotating at least some of the panels about the axis of rotation in a fan-type manner to fully operative angular positions to form a composite panel arrangement;
   a condenser mounted at one axial end of the stack of panels;
   first means for drawing at least some of the panels axially toward a generally common plane adjacent the condenser means when the panels are in their fully operative angular positions; and
   second means for drawing the panels into tight engagement with the condenser means.

10. The deployable panel system of claim 9 wherein said first means includes a plurality of axially extending post-like members spaced angularly about said mounting means for individually engaging respective ones of the panels.

11. The deployable panel system of claim 10 wherein the post-like members comprise ball screws engageable within angularly open-ended slots in the panels.

12. The deployable panel system of claim 10 wherein the post-like members are of progressively varying heights to permit some of the panels to pass over some of the post-like members when being rotated to their operative angular positions.

13. The deployable panel system of claim 9 wherein each panel includes a reinforcing hub located inwardly toward the axis of rotation thereof and said second means is engageable individually with the respective reinforcing hubs.

14. The deployable panel system of claim 13 wherein said second means include power actuated screw means engageable with the reinforcing hubs.

15. The deployable panel system of claim 9 wherein the condenser means has a generally flat engaging surface facing the panels and the panels have complementary flat engaging surfaces.

16. The deployable panel system of claim 9 wherein one of the panels is fixed and the other panels are even in number, one-half of the panels being rotatable in one direction and the other one-half of the panels being rotatable in the opposite direction relative to the fixed panel toward their fully operative angular positions.

17. The deployable panel system of claim 9 wherein said mounting means includes a central drum-like structure about the axis of rotation and said rotating means are mounted within the drum.

18. The deployable panel system of claim 17 wherein the rotating means comprise a plurality of motors mounted on the drum for individually rotating the respective panels to their fully operative angular positions.

19. The deployable panel system of claim 18 wherein each motor is mounted inside the drum and has a drive gear engageable through a window in the drum with a gear segment formed on the inner periphery of the respective panel.

* * * * *